Nov. 10, 1959    A. I. MANES ET AL    2,912,098
BELT CONVEYOR
Filed Aug. 13, 1957    2 Sheets-Sheet 1
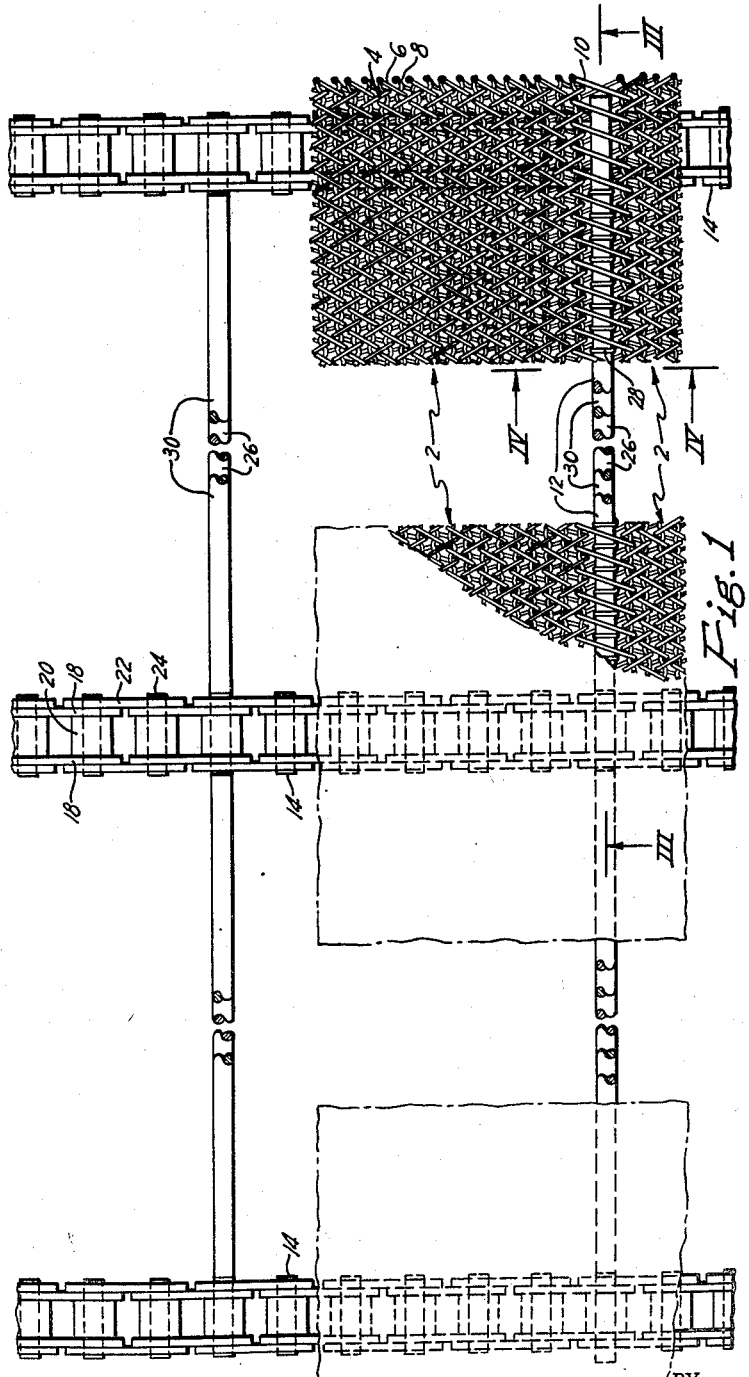
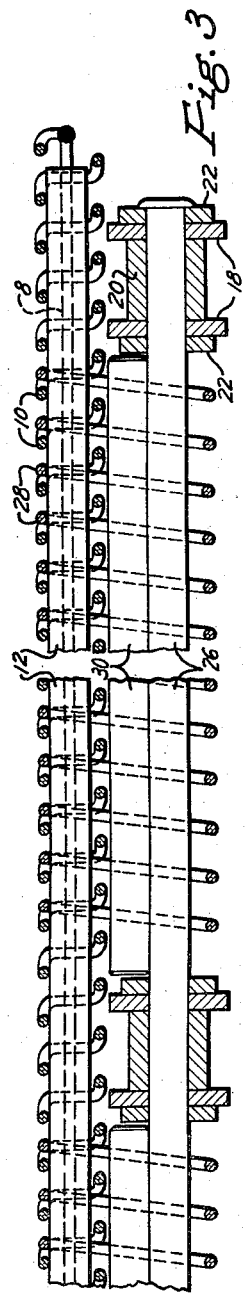
INVENTORS
ANTONE I. MANES &
THEODORE McKINLEY
BY Donald G. Dalton
THEIR ATTORNEY

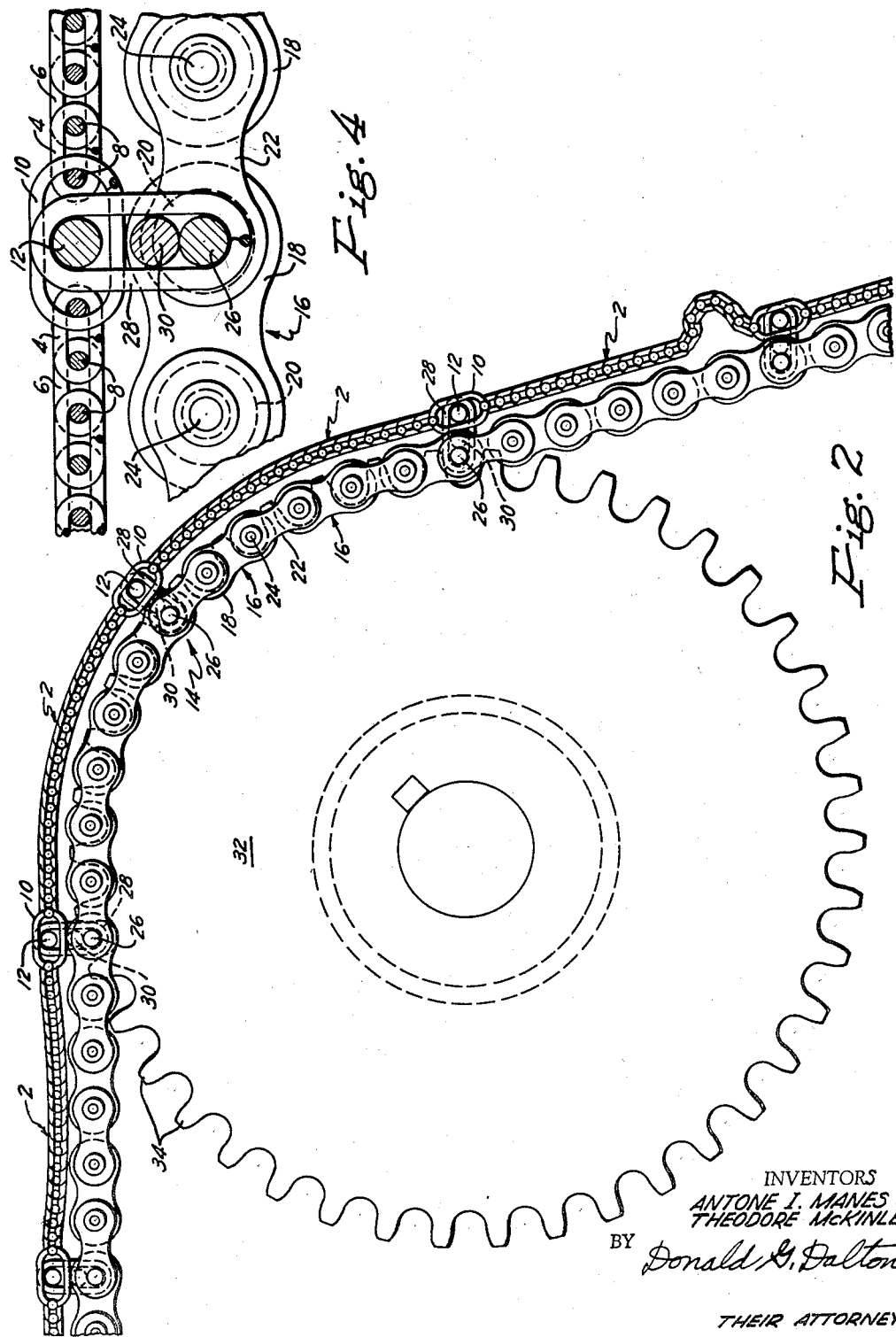

United States Patent Office
2,912,098
Patented Nov. 10, 1959

2,912,098

BELT CONVEYOR

Antone I. Manes and Theodore McKinley, Oakland, Calif., assignors to United States Steel Corporation, a corporation of New Jersey Application August 13, 1957, Serial No. 677,928

5 Claims. (Cl. 198—194)

This invention relates to a belt conveyor and more particularly to a conveyor made of wire mesh which is to be used to convey fruits and vegetables through a dehydration process. Since the process must be closely timed due to the physical properties of the product a positive driven belt must be used. In the conveyors used prior to our invention chains were connected to the wire mesh by means of transverse rods which extended beyond the belt and to which the chains were attached. This construction is shown in Guba Patent No. 2,114,180, dated April 12, 1938. The objection to this construction is that the open spaces are greater than that of a woven mesh at the points of attachment to the chain. The prior construction also permits considerable product loss in addition to permitting some of the material to be processed beyond the required time, thus resulting in discoloration of the finished product.

It is therefore an object of our invention to provide a wire mesh conveyor belt in which the entire supporting surface is formed of wire mesh.

This and other objects will be more apparent after referring to the following specification and attached drawings, in which:

Figure 1 is a top plan view of the belt of our invention;

Figure 2 is an enlarged end view of the belt showing it passing over a sprocket;

Figure 3 is an enlarged view taken on the line III—III of Figure 1; and

Figure 4 is an enlarged view taken on the line IV—IV of Figure 1.

Referring more particularly to the drawings, the reference numeral 2 indicates a panel of wire mesh belting. This belt is shown the same as that in King Patent No. 1,952,873, dated March 27, 1934, although the invention is not limited to this particular type of belt. As shown, each panel consists of a plurality of spiral elements 4, the spirals of which extend in one direction and a plurality of spiral elements 6, one located between each pair of elements 4. The spirals of element 6 extend in the opposite direction to the spirals of element 4. Between adjacent spiral elements 4 and 6 are cross members 8 which are formed with a plurality of crimps to receive the portions of the adjacent spiral members so as to hold them together. The ends of the cross members 8 may be welded or otherwise attached to the spiral members 4 and 6. The panels 2 are connected to one another by means of a coil of wire 10 having the same pitch or a multiple of the pitch of elements 4 and 6. The coils 10 receive the end cross members 8 of the adjacent panels 2, thus holding the panels together. A cross rod 12 is received within the coil 10 and is preferably prevented from transverse movement in any suitable manner such as by upsetting the ends thereof or by welding to the coil 10. A plurality of chains 14 are fastened to the underside of the panels 2. One chain 14 is located adjacent each side of the conveyor belt with other chains being located therebetween if desired. As shown, each of the chains 14 consists of a plurality of members 16 formed of two side links 18 connected by bushings 20 with the members 16 being connected by links 22 and pins 24. The pins 24 are omitted from the chains 14 below the cross rod 12 and replaced by a second cross rod 26 which extends the full width of the belt 2. A spiral wire 28 extends between each pair of chains 14, around the bars 12 and 26 and between the spirals of coil 10. If desired, spacer rods 30 may be located within the spiral wire 28 between the rods 12 and 26. The rods 30 are of such length that they will butt against adjacent chains 14 and maintain the chains in parallel relationship with one another.

In operation the belt 2 is supported on sprockets 32 at spaced intervals with the chains 14 receiving teeth 34 of the sprocket 32. The distance between adjacent cross rods 12 is greater than the distance between adjacent rods 26 so as to compensate for the difference in length of arc as the belt passes over the sprockets 32. This difference in length will vary depending upon the diameter of the sprockets 32. Thus it is seen that an endless conveyor belt is furnished wherein the supporting surface of the belt is of substantially uniform mesh throughout and wherein the belt is driven by chains and sprockets.

While one embodiment of our invention has been shown and described it will be apparent that other adaptations and modifications may be made without departing from the scope of the following claims.

We claim:

1. A belt conveyor comprising a plurality of panels of relatively flat mesh, a connection between adjacent panels, a chain beneath said panels at each side thereof, said panels overhanging said chains, at least one chain located between said side chains beneath said panels, a rod extending between and connecting said chains below each of said connections, a second rod extending transversely of said belt and fastened thereto at each of said connections, means connecting said first and second rod at each of said connections, and rods between said first and second rods at each connection, each of said last named rods extending between adjacent chains to maintain the chains in parallel relationship.

2. A belt conveyor comprising a plurality of panels of spiral fabric arranged end to end, said spiral fabric including spiral elements connected by cross members, a coil of wire connecting the end cross members of said panels, a rod extending transversely through said coil, a plurality of chains at least one beneath each side of said panels, said panels overhanging with chains, a rod extending between and connecting said chains below each of said connections, and a spiral wire surrounding said rods at each connection.

3. A belt conveyor comprising a plurality of panels of spiral fabric arranged end to end, said spiral fabric including spiral elements connected by cross members, a coil of wire connecting the end cross members of said panels, a rod extending transversely through said coil, a chain beneath said panels at each side thereof, said panels overhanging said chains, at least one chain located between said side chains beneath said panels, a rod extending between and connecting said chains below each of said first named rods, a spiral wire surrounding said rods at each connection, the length of each of said panels being greater than the length of the chains between adjacent pairs of said last named rods, and rods between said first and second rods at each connection, each of said last named rods extending between adjacent chains to maintain the chains in parallel relationship.

4. A belt conveyor comprising a plurality of panels of relatively flat mesh connected together, a plurality of chains at least one beneath each side of said panels, each of said chains having a plurality of links with a pivot connection therebetween, a rod extending between and connecting said chains below said panels, said rod being in axial alignment with a pivot connection on each chain, said panels overhanging said chains, a second rod extending transversely of said belt and fastened thereto above said first named rod, and means connecting said first and second rod at each connection.

5. A belt conveyor comprising a plurality of panels of spiral fabric arranged end to end, said spring fabric including spiral elements connected by cross members, a coil of wire connecting the end cross members of said panels, a rod extending transversely through said coil, a chain beneath said panels at each side thereof, each of said chains having a plurality of links with a pivot connection therebetween, a rod extending between and connecting said chains below each of said first named rods, each of said second named rods being in axial alignment with a pivot connection on each chain, said panels overhanging said chains, a spiral wire surrounding said rods at each connection, and rods between said first and second rods at each connection, each of said last named rods extending between adjacent chains to maintain the chains in parallel relationship.

References Cited in the file of this patent

UNITED STATES PATENTS

| | | |
|---|---|---|
| 1,078,528 | Allsop | Nov. 11, 1913 |
| 2,114,180 | Guba | Apr. 12, 1938 |

FOREIGN PATENTS

| | | |
|---|---|---|
| 985,132 | France | Mar. 7, 1951 |